United States Patent Office 3,335,155
Patented Aug. 8, 1967

3,335,155
NITRO-CONTAINING EPOXY COMPOUNDS
Gustave B. Linden, Short Hills, N.J., and Ralph E. Meyer and Clinton R. Vanneman, Sacramento, Calif., assignors to Aerojet-General Corporation, Azusa, Calif., a corporation of Ohio
No Drawing. Original application June 2, 1964, Ser. No. 372,122. Divided and this application Oct. 12, 1965, Ser. No. 516,804
4 Claims. (Cl. 260—348)

This application is a division of Ser. No. 372,122, filed June 2, 1964.

This invention pertains to several types of novel epoxy compounds containing in the molecular structure one or more nitro groups, and to their method of synthesis.

Nitro-containing diols have been used in the preparation of binders for solid rocket propellants. While these known binders do possess a fairly high specific impulse, their mechanical and chemical properties still leave room for considerable improvement. In the commercial polyurethane field, it is known that the use of polyalkylene ether polyols improves the properties of polymers produced from them. The polyurethanes from polyalkylene ether polyols are disclosed in U.S. Patent No. 2,948,691, issued August 9, 1960. However, the advantages resultant from polyether linkages in the polyurethane chain have not heretofor been available in the high energy polymer binder field because of the lack of a suitable monomer from which could be obtained high-molecular weight, nitro-containing polyalkylene ether polyols. According to our invention, there now has been discovered several classes of nitro-containing epoxy compounds which are capable of polymerization to the corresponding polyalkylene ether polyols and then to polyurethane propellant binders. These new compounds enable propellant chemists to prepare propellant binders which are characterized by the benefits associated with the presence of a multiplicity of ether linkages along the polymer chain, and at the same time retain the energy and oxidizing power of nitro groups.

It is, therefore, an object of this invention to prepare several novel classes of nitro-containing epoxy compounds capable of undergoing polymerization to high molecular weight polyalkylene ether diols containing many nitro groups. Another object of our invention is to prepare these new epoxy compounds in a manner whereby they are obtained in the high purity required to meet the exacting standards demanded by the reliability requirements which exist in the solid propellant art. These objects, as well as others, will be evident from the more specific description of our invention which follows.

The novel epoxy compounds of this invention are those having the following generic formulae:

(I)
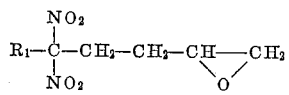

wherein $R_1$ is lower alkyl, preferably of from 1 to about 6 carbons such as methyl, ethyl and hexyl;

(II)
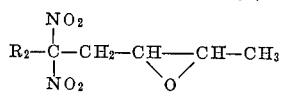

wherein $R_2$ is lower alkyl of from 1 to about 6 carbons; and (III)
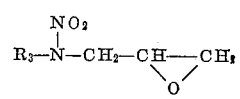

wherein $R_3$ is lower alkyl of from 1 to about 6 carbons.

In each of the foregoing three formulae, $R_1$, $R_2$ or $R_3$ is most preferably methyl or ethyl.

Compounds within the scope of Formula I include:

5,5-dinitro-1,2-epoxyhexane
5,5-dinitro-1,2-epoxyheptane
5,5-dinitro-1,2-epoxyoctane
5,5-dinitro-1,2-epoxydecane
5,5-dinitro-1,2-epoxydodecane Illustrative compounds of the type defined by Formula II include:

5,5-dinitro-2,3-epoxyhexane
5,5-dinitro-2,3-epoxyheptane
5,5-dinitro-2,3-epoxyoctane
5,5-dinitro-2,3-epoxydecane
5,5-dinitro-2,3-epoxydodecane Preferred species of the Formula III compounds are:

4-nitraza-2,3-epoxypentane;
4-nitraza-1,2-epoxyhexane;
4-nitraza-1,2-epoxyoctane;
4-nitraza-1,2-epoxydecane;
4-nitraza-1,2-epoxydodecane.

The compounds of Formula I are prepared in accordance with the following general reaction equation:

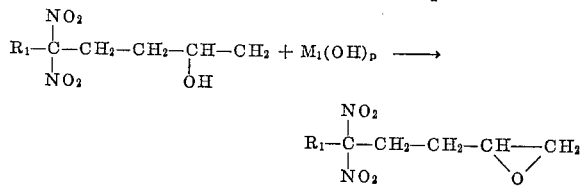

wherein $R_1$ is as defined above; $X_1$ is halogen, such as iodine, bromine or chlorine; and $M_1$ is an alkali or alkaline earth metal such as lithium, sodium, potassium, calcium or barium, and $p$ is one or two and is equal to the valence of $M_1$. This reaction is carried out in the presence of a lower alkanol such as methanol or ethanol. While not critical, the $M_1(OH)_p$ reactant is usually employed in about a stoichiometric amount or a slight excess. The reaction takes place satisfactorily at room temperature, however, any temperature from about 0° C. to about 100° C. is suitable. The 5,5-dinitro-1-halo-2-alkanol starting materials utilized in this reaction are readily obtained by treating the corresponding 5,5-dinitro-1,2-alkanediol with a dehydrating acid such as sulfuric acid in the presence of a hydrogen halide.

The following example illustrates the preparation of a compound of the type depicted in Formula I.

The examples of our specification are presented solely to illustrate the invention, and should not be regarded as limitative in any way. In the examples, the parts are by weight unless otherwise indicated.

EXAMPLE I

5,5-dinitro-1,2-epoxyhexane 14.3 grams (0.0686 mole) of 5,5-dinitro-1,2-hexanediol was added to a mixture of 2.5 grams (0.150 mole) of 48 percent aqueous hydrobromic acid and 3.5 ml. (0.0642 mole) of concentrated sulfuric acid. The reaction mixture was refluxed (liquid temperature 128° C.) for one hour. The reflux condenser was then removed and the unreacted hydrobromic acid was driven off by boiling for an additional one-half hour. Two layers were present in the reaction mixture, the top water layer and a thick, dark organic layer. Twenty-five milliliters of methylene chloride was added in order to lower the viscosity of the organic material and to facilitate its removal from the vessel. The layers were then separated and the organic layer was extracted 5 times with a total of 100 ml. of water to remove residual sulfuric acid, hydrobromic acid and unreacted 5,5-dinitro-1,2-hexanediol. After the bulk of the methylene chloride was removed from the oil layer by partial vacuum distillation, the remainder of the liquid was allowed to stand at room temperature at a pressure of approximately $1 \times 10^{-4}$ mm. for approximately one-half hour to insure the removal of water and methylene chloride. No condensate was obtained at this pressure as the temperature was raised until a vapor temperature 145° to 150° C. was reached, at which point 7.2 grams of a clear, amber colored, viscous distillate was obtained. Analysis of this material by titration of a weighed sample with standard methanolic sodium hydroxide to the phenolphthalein end point indicated the purity of the 5,5-dinitro-1-bromohexanol-2 to be 98.23 percent.

A portion of this bromohydrin was titrated with methanolic sodium hydroxide solution (approximately 0.2 N) to the phenolphthalein end point. The methanol was then removed at reduced pressure leaving an oil and a white precipitate (NaBr). The oil was decanted off and distilled (B. 110° C. at approximately $1 \times 10^{-4}$ mm.). Titration of this distillate for epoxide oxygen by treatment with an excess of standard HCl (0.2 N) in dioxane and back titration with 0.1 N methanolic sodium hydroxide to a cresol red end point indicated that a purity of 92.4 percent was obtained, calculated as 5,5-dinitro-1,2-epoxyhexane.

The compounds of Formula II are prepared according to the following reaction scheme:

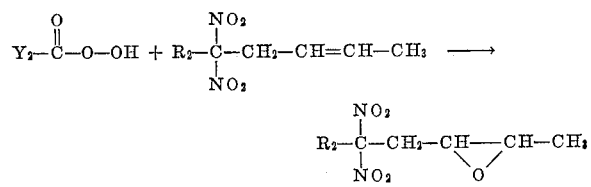

wherein $R_2$ is as defined above, and $Y_2$ is a monovalent aromatic or aliphatic organic radical. Typically, $Y_2$ is lower alkyl, lower haloalkyl such as trifluoromethyl, or phenyl. The per-acids used in this reaction and in preparation of the compounds of Formula III, below, are prepared by treating the corresponding acid anhydride with hydrogen peroxide at −20° C. to about +20° C. Suitable per-acids for use in this reaction include peroxytrifluoroacetic acid, peroxyacetic acid and peroxybenzoic acid. The 5,5-dinitro-2-alkenes used in the reaction are produced by dehydrating the corresponding 5,5-dinitro-2-alkanols with sulfuric acid at elevated temperature. The 5,5-dinitro-2-alkene and the per-acid are utilized in about stoichiometrically equivalent amounts, or a stoichiometric excess of the per-acid. Preferably, the reaction is carried out in a solvent for the alkene reactant such as the halohydrocarbons (methyl chloride, methylene dichloride, methyl bromide, etc.). Best yields result when there is added to the reaction media a buffer compound. Common buffers which are of benefit include sodium carbonate, disodium acid phosphate, and sodium bicarbonate. The reaction normally takes place at a temperature of from about 20° C. to about 150° C.

The following shows the preparation of a Formula II compound.

EXAMPLE II

5,5-dinitro-2,3-epoxyhexane 45.34 ml. of 90 percent hydrogen peroxide was added to 215.5 ml. of anhydrous methylene chloride and this two phase system was cooled to 0° C. 273.6 ml. of trifluoroacetic anhydride was then added over a period of 1½ hours, during which time the reaction mixture became a one phase, homogeneous solution. Titration of an aliquot of this reaction mixture with KI—$Na_2S_2O_3$ in acetic acid indicated no appreciable loss of peroxide oxygen in this reaction.

The above reaction mixture, containing both peroxytrifluoroacetic acid and trifluoroacetic acid, was then added over a 2½ hour period to a well-stirred, refluxing mixture of 800 ml. of methylene chloride containing 150 grams of 5,5-dinitro-2-hexene and 292.3 grams of sodium acid carbonate. The olefin was miscible with the methylene chloride. After addition was completed, the reaction mixture was refluxed for an additional half hour.

The inorganic salts were then dissolved by the addition of 1500 ml. of water to the reaction mixture. The layers were separated and the water layer extracted three times with a total of 650 ml. of methylene chloride. The methylene chloride layers were then dried over magnesium sulfate, filtered, and the solvent removed at reduced pressure. A high boiling liquid remained which was analyzed for epoxide oxygen by the addition of excess standard HCl in dioxane (10 ml. of 0.2 N acid per 0.2 g. sample) then back titration of unreacted acid with standard (0.2 N) methanolic sodium hydroxide to the cresol red end point. The solution analyzed 84.3 percent pure, calculated as 5,5-dinitro-2,3-epoxyhexane, indicating a crude yield of 84.7 percent had been attained.

A portion of this solution was extracted with water, dried over magnesium sulfate and distilled in a bulb tube yielding a center-cut (B.P. 80° C. at approx. $1 \times 10^{-4}$ mm.) which analyzed 96.9 percent pure. An elemental analysis of this material gave the following results.

Calculated: C, 37.90; H, 5.31; N, 14.70. Found: C, 37.87; H, 5.16; N, 14.20.

The product is a clear, pale yellow, mobile liquid, sp. gr. 1,269, $N_D^{25}$ 1.4569.

The compounds of Formula III result from the reaction shown in the following equation:

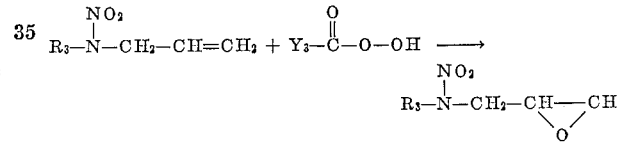

wherein $R_3$ is as defined previously, and $Y_3$ is a monovalent aromatic or aliphatic organic radical such as phenyl, trifluoromethyl, methyl, etc.

The above reaction is preferably, although not necessarily carried out in the presence of a halohydrocarbon solvent of the type employed in the preparation of the compounds of Formula II. In this reaction, proportions are not critical, but best results are obtained when the per-acid is used in a slight stoichiometric excess over the amount of the olefin reactant. The reaction temperature usually is within the range from about 0° C. to about 150° C. Common buffers, such as sodium carbonate, disodium acid phosphate and sodium bicarbonate are preferably employed in the reaction mixture and their presence is found to result in higher product yields.

The following two examples illustrate the preparation of the compounds of Formula III.

EXAMPLE III

4-nitraza-1,2-epoxypentane

Twenty-nine grams (0.25 mole) 4-nitraza-1-pentane was added to a solution of 38 grams (0.275 mole) perbenzoic acid in chloroform (.06693 grams/ml.), and the resulting solution was stored overnight in a refrigerator. After 18 hours, only 13.5 percent of the theoretical amount of perbenzoic acid had been consumed, and the solution was stored at ambient temperature in the dark for the remaining reaction period. At the higher temperature, the rate of epoxidation was increased, but the increased rate of decomposition of the perbenzoic acid was more pronounced. After 47 hours, 37.5 percent of the theoretical amount of perbenzoic acid was consumed. Sufficient perbenzoic acid was added at this time to give a 106 mole percent excess of this reagent over the remaining quantity of the olefin, and the reaction was continued for a total period of 136 hours. The solution was treated with sodium carbonate solution until the chloroform solution failed to give a test for perbenzoic acid, washed with water, and dried over anhydrous calcium sulfate. Distillation of the solvent at reduced pressure gave 27.9 grams residue, $n_D^{25}$ 1.5046. On prolonged storage in the cold, this liquid deposited 1.3 grams crystals which were purified by recrystallization from methanol and shown to be benzoyl peroxide, apparently carried through from the preparation of perbenzoic acid. The filtrate was transferred to a small Claisen flask and distilled at reduced pressure.

Cut 1: B.P. 63° C./10μ; 4.1 gram; $n_D^{25}$ 1.4880
Cut 2: B.P. 63.5° C./8–10μ; 11.8; $n_D^{25}$ 1.4868
Cut 3: B.P. 63.5–67° C./8μ; 1.7 gram.
Residue: 7.4 grams.

The residue set to a glass on cooling to room temperature and was the hydroxybenzoate resulting from the ring opening of the epoxide. The first two fraction corresponded to a 60.2 percent yield of crude 4-nitraza-1,2-epoxypentane. These fractions were combined and redistilled.

Cut 1: B.P. 53–57° C./ 3–4μ; 1.9 grams; $n_D^{25}$ 1.4876
Cut 2: B.P. 53–57° C./3–4μ; 9.1 grams; $n_D^{25}$ 1.4870
Cut 3: B.P. 53–57° C./4μ; 2.3 grams; $n_D^{25}$ 1.4867

The infrared spectrum of the second fraction (3.45(w.), 5.85(w.), 6.60(s.), 6.80(m.), 6.90(m.), 7.10(m.), 7.50(s.), 7.75(v.s.), 9.85(m.), 10.40(m.), 10.65(m.), 10.95(w.), 11.70(m.), 12.00(w.), 13.10(m.), 15.10(w.)) indicated the desired epoxide with no hydroxyl contamination. A sample of this material was submitted for microanalysis.

*Analysis.*—Calc'd. for $C_4H_8N_2O_3$: Percent C, 36.36; percent H, 6.10; percent N, 21.21. Found: Percent C, 37.22; percent H, 6.12; percent N, 21.13.

EXAMPLE IV

*4-nitraza-1,2-epoxypentane*

Peroxytrifluoroacetic acid was prepared by the addition of 42.3 ml. (0.3 mole) trifluoroacetic anhydride to a stirred suspension of 7 ml. (0.25 mole) 90 percent hydrogen peroxide in 50 ml. dry methylene chloride, with icebath cooling during a 10 minute period. The reaction solution was stirred in the cold for an additional 15 minutes, transferred to a separatory funnel, and added to a vigorously agitated mixture of 24.4 grams (0.21 mole) 4-nitraza-1-pentene, 95.4 grams (0.9 mole) powdered sodium carbonate, and 200 ml. methylene chloride during a 35 minute period. The mixture was held at 30–35° C. by external cooling during this addition, and was then heated at reflux temperature with continued stirring for 30 minutes. Ice water (500 ml.) was added, and the mixture was allowed to stir until dissolution of the inorganic salts. The two-phase mixture was separated, and the aqueous phase was extracted four times with 50 ml. portions of methylene chloride. The combined organic phases were dried over anhydrous calcium sulfate, and the solvent was distilled at diminished pressure. The reduced pressure distillation of the residue from a Claisen flask did not give an efficient separation of product and starting material (total distillate, 20.4 grams $n_D^{25}$ 1.4724 to 1.4811; residue 1.3 grams $n_D^{25}$ 1.4884), and the distillate was fractionated using a Holzman column.

Cut 1: B.P. 56–58° C./2 mm.; 4.9 grams; $n_D^{25}$ 1.4745
Cut 2: B.P. 56–96° C./2 mm.; 2.8 grams; $n_D^{25}$ 1.4747
Cut 3: B.P. 96° C./2 mm.; 9.7 grams; $n_D^{25}$ 1.4832
Residue: 1.4 grams; $n_D^{25}$ 1.4832

The first two fractions represent a 31.6 percent recovery of 4-nitraza-1-pentene and the third cut corresponds to a 35 percent yield of 4-nitraza-1,2-epoxypentane.

As can be seen from these examples, the reactions of our invention are generally carried out at atmospheric pressure. The products are isolated in conventional manner by distillation, evaporation, crystallization and/or extraction.

The nitro-containing epoxy compounds of this invention are converted to high molecular weight polyether diols by polymerization at room temperature or at elevated temperature in the presence of water or ethylene glycol. The resultant diols have a molecular weight of from 1,000 to about 10,000, and are readily polymerizable with polyisocyanates, such as toluene diisocyanate or 3-nitraza-1,5-pentane diisocyanate, to yield polyurethane polymers. These polyurethane polymers are of high specific impulse, and provide solid rocket propellants of improved mechanical and chemical properties. Thus, as is indicated above, the epoxy compounds of this invention enable those skilled in the art to prepare a new class of improved solid propellants.

The epoxy compounds of this invention, which contain one or more nitro groups, are also inherently useful as high explosives. In addition, these compounds can be used in any conventional explosive missile, projectile, rocket, or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

Having fully described the invention, it is intended that it be limited only by the lawful scope of the appended claims.

We claim:
1. Compounds of the formula:

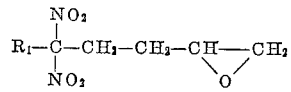

wherein $R_1$ is lower alkyl.
2. The compound 5,5-dinitro-1,2-epoxyhexane.
3. Compounds of the formula:

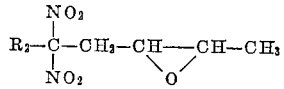

wherein $R_2$ is lower alkyl.
4. The compound 5,5-dinitro-2,3-epoxyhexane.

References Cited

UNITED STATES PATENTS 3,211,792    10/1965    Osbond et al. _____ 260—570.6

FOREIGN PATENTS 1,035,638    8/1958    Germany.

OTHER REFERENCES

Elderfield: Heterocyclic Compounds, volume I, pages 3–4 (1950).
Houben-Wyel: Methoden der Organischen Chemie, volume 14/2 (1963).

WALTER A. MODANCE, *Primary Examiner.*

NORMA S. MILESTONE, *Examiner.*